United States Patent
Gotoh et al.

(10) Patent No.: US 9,188,778 B2
(45) Date of Patent: Nov. 17, 2015

(54) DISPLAY DEVICE

(75) Inventors: Toshimitsu Gotoh, Osaka (JP); Yukio Mizuno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 95 days.

(21) Appl. No.: 14/110,347

(22) PCT Filed: Apr. 5, 2012

(86) PCT No.: PCT/JP2012/059393
§ 371 (c)(1),
(2), (4) Date: Oct. 7, 2013

(87) PCT Pub. No.: WO2012/137879
PCT Pub. Date: Oct. 11, 2012

(65) Prior Publication Data
US 2014/0022475 A1    Jan. 23, 2014

(30) Foreign Application Priority Data
Apr. 8, 2011 (JP) .................................. 2011-086588

(51) Int. Cl.
G02F 1/1343 (2006.01)
G02B 27/00 (2006.01)
G02B 27/22 (2006.01)
G02F 1/1335 (2006.01)

(52) U.S. Cl.
CPC ........ G02B 27/0093 (2013.01); G02B 27/2264 (2013.01); G02F 1/133512 (2013.01); G02F 1/134309 (2013.01)

(58) Field of Classification Search
CPC ........................ G02B 27/0093; G02B 27/2264
USPC .......................................................... 349/15
See application file for complete search history.

(56) References Cited

U.S. PATENT DOCUMENTS

| | | |
|---|---|---|
| 6,049,424 A | 4/2000 | Hamagishi |
| 2007/0146233 A1 | 6/2007 | Lee et al. |
| 2007/0183015 A1 | 8/2007 | Jacobs et al. |
| 2007/0188667 A1* | 8/2007 | Schwerdtner .................. 349/15 |
| 2011/0006979 A1 | 1/2011 | Min et al. |

FOREIGN PATENT DOCUMENTS

| | | |
|---|---|---|
| JP | 09-197344 A | 7/1997 |
| JP | 10-123459 A | 5/1998 |
| JP | 2007-171908 A | 7/2007 |
| JP | 2007-293270 A | 11/2007 |
| JP | 2011-018049 A | 1/2011 |

OTHER PUBLICATIONS

Official Communication issued in International Patent Application No. PCT/JP2012/059393, mailed on Jul. 10, 2012.

* cited by examiner

*Primary Examiner* — James Dudek
(74) *Attorney, Agent, or Firm* — Keating & Bennett, LLP (57) ABSTRACT

Provided is a display device characterized in that a display area can be prevented from appearing darker when the position of light-shielding sections are moved, while the control of voltages applied to electrodes is simplified. In the case where electrodes to which a specific voltage is applied are changed from a first electrode group (e.g., 52a) to a second electrode group (e.g., 52b, 58a, 58b), the voltage applied to the first electrode group is switched from the specific voltage to a reference voltage first, and thereafter, the voltage applied to the second electrode group is switched from the reference voltage to the specific voltage.

9 Claims, 8 Drawing Sheets

DISPLAY DEVICE

TECHNICAL FIELD

The present invention relates to a display device that includes an image separation unit.

BACKGROUND ART

In recent years, a display device that includes an image separation unit has been proposed. For example, JP9(1997)-197344A discloses a stereoscopic video display device in which a right eye image and a left eye image displayed on a liquid crystal panel are separated by using a light-shielding barrier formed in a light-shielding liquid crystal panel.

By the way, in such a display device, it is desirable that the position of the light-shielding barrier is moved according to the position of the head of a viewer. For example, JP9(1997) 197344A discloses that a liquid crystal shutter provided at each end of an opening in the light-shielding barrier in the lateral direction is selectively turned ON/OFF so as to move the position of the light-shielding barrier transversely.

However, in the case where the liquid crystal that forms the liquid crystal shutter is liquid crystal having a slow response speed, for example, TN liquid crystal, the response speed of the liquid crystal when the liquid crystal shutter is turned ON is faster than the response speed of the liquid crystal when the liquid crystal shutter is turned OFF. As a result, there arises the following problem: in the case where the liquid crystal shutter is simply turned ON/OFF, the display area of the display device becomes totally darker when the position of the light-shielding barrier is moved.

It should be noted that JP2011-18049A discloses a luminance flicker control device that varies a voltage applied to division barrier electrodes when the position of the parallax barrier is moved. However, in the configuration disclosed in JP2011-18049A, among a plurality of division barrier electrodes, a voltage is applied to some division barrier electrodes that are adjacent in the direction in which the plurality of division barrier electrodes are arrayed, whereby each barrier that composes the parallax barrier is formed. As a result, there arises a problem that the control of the voltages applied to the division barrier electrodes becomes complicated.

Disclosure of Invention

An object of the present invention is to provide a display device characterized in that a display area can be prevented from appearing darker when the position of light-shielding sections are moved, while the control of voltages applied to electrodes is simplified.

A display device of the present invention includes: a display unit that displays a synthetic image, the synthetic image being formed by dividing a plurality of images that are different from one another, and arraying these division images in a predetermined order; and an image separation unit that separates the plurality of images included in the synthetic image, wherein the image separation unit includes: a pair of substrates at least one of which has two types of electrode groups formed thereon, a reference voltage and a specific voltage different from the reference voltage being selectively applied to the two types of electrode groups; a liquid crystal layer sealed between the pair of substrates; a detection unit that detects a viewer's eye position; and a control unit that applies the specific voltage to one electrode groups that is selected from the electrode groups according to the viewer's eye position detected by the detection unit, so as to cause orientations of liquid crystal molecules in the liquid crystal layer to change, thereby to realize light-shielding sections that block light, wherein the electrode groups include a plurality of electrodes that are parallel to each other, on the substrate on which the two types of electrode groups are formed, out of the pair of substrates, the electrodes belonging to one of the two types of electrode groups and the electrodes belonging to the other electrode group are alternately arranged, and in the case where electrodes to which the specific voltage is applied are changed from a first electrode group to a second electrode group, the control unit switches the voltage applied to the first electrode group from the specific voltage to the reference voltage, and thereafter, switches the voltage applied to the second electrode group from the reference voltage to the specific voltage.

The display device of the present invention makes it possible to prevent the display area from appearing darker when the position of light-shielding sections are moved, while simplifying the control of voltages applied to the electrodes.

DESCRIPTION OF PREFERRED EMBODIMENTS

A display device according to one embodiment of the present invention includes: a display unit that displays a synthetic image, the synthetic image being formed by dividing a plurality of images that are different from one another, and arraying these division images in a predetermined order; and an image separation unit that separates the plurality of images included in the synthetic image, wherein the image separation unit includes: a pair of substrates at least one of which has two types of electrode groups formed thereon, a reference voltage and a specific voltage different from the reference voltage being selectively applied to the two types of electrode groups; a liquid crystal layer sealed between the pair of substrates; a detection unit that detects a viewer's eye position; and a control unit that applies the specific voltage to one electrode groups that is selected from the electrode groups according to the viewer's eye position detected by the detection unit, so as to cause orientations of liquid crystal molecules in the liquid crystal layer to change, thereby to realize light-shielding sections that block light, wherein the electrode groups include a plurality of electrodes that are parallel to each other, on the substrate on which the two types of electrode groups are formed, out of the pair of substrates, the electrodes belonging to one of the two types of electrode groups and the electrodes belonging to the other electrode group are alternately arranged, and in the case where electrodes to which the specific voltage is applied are changed from a first electrode group to a second electrode group, the control unit switches the voltage applied to the first electrode group from the specific voltage to the reference voltage, and thereafter, switches the voltage applied to the second electrode group from the reference voltage to the specific voltage (the first configuration).

In the first configuration, one electrode group to which the specific voltage is to be applied may be selected according to the viewer's eye position. Therefore, the control of the voltages to be applied to the electrodes can be simplified.

Further, in the case where electrodes to which the specific voltage is applied are changed from the first electrode group to the second electrode group, the voltage applied to the first electrode group is switched from the specific voltage to the reference voltage first, and thereafter, the voltage applied to the second electrode group is switched from the reference voltage to the specific voltage. Therefore, this makes it possible to approximately equalize the time necessary for realizing a new light-shielding section, and the time necessary for removing light-shielding sections that have been realized so far. As a result, it is possible to prevent the display area from becoming darker when the position of the light-shielding section is moved.

The second configuration is the first configuration modified so that the two types of electrode groups are formed on each of the pair of substrates, and each of the electrodes belonging to the electrode groups formed on one of the substrates overlaps, in a normal direction of the substrate, one electrode belonging to one of the two electrode groups and one electrode belonging to the other electrode group formed on the other substrate. In such a configuration, variations of the distance for which the light-shielding section moves can be increased easily.

The third configuration is the first or second configuration modified so that in the case where the voltage applied to the electrode groups is switched from the reference voltage to the specific voltage, the control unit applies a voltage at a level between the reference voltage and the specific voltage at least once. Such a configuration makes it possible to provide a natural appearance when the light-shielding section moves.

The fourth configuration is any one of the first to third configurations modified so that, in the case where the voltage applied to the electrodes is switched from the specific voltage to the reference voltage, the control unit applies a voltage at a level between the reference voltage and the specific voltage at least once. Such a configuration makes it possible to prevent the light-shielding section that has been realized so far from disappearing suddenly.

The fifth configuration is any one of the first to fourth configurations modified so that the image separation unit further includes a temperature sensor that detects an ambient temperature of the display panel, and the control unit changes a duration of a period in which the voltage is switched from the reference voltage to the specific voltage according to a result of detection by the temperature sensor. Such a configuration makes it possible to carry out the switching from the reference voltage to the specific voltage, with response speeds of the liquid crystal molecules owing to differences of the temperature being taken into consideration. As a result, this makes it easier to approximately equalize the time necessary for realizing a new light-shielding section, and the time necessary for removing light-shielding sections that have been realized so far, even in the case where the temperature changes.

The sixth configuration is any one of the first to fifth configurations modified so that the specific voltage and the reference voltage are alternating-current voltages having phases opposite to each other. Such a configuration makes it easier to generate the specific voltage and the reference voltage.

The seventh configuration is any one of the first to fifth configurations modified so that the reference voltage is at a constant level, and the specific voltage is an alternating-current voltage. Such a configuration makes it easier to generate the reference voltage.

The eighth configuration is any one of the first to seventh configurations modified so that the display unit includes a display panel having a display area on which a plurality of pixels used for displaying the synthetic image are formed.

The ninth configuration is the eighth configuration modified so that the display panel is a transparent liquid crystal panel. In such a configuration, either the image separation unit or the display panel may be positioned on the viewer side. As a result, this improves the degree of freedom in the designing of a display device.

Hereinafter, more specific embodiments of the present invention are explained with reference to the drawings. It should be noted that, for convenience of explanation, each figure referred to hereinafter shows only principal members necessary for explanation of the present invention, in a simplified state, among the constituent members of the embodiments of the present invention. Therefore, the display device according to the present invention may include arbitrary constituent members that are not shown in the drawings referred to in the present specification. Further, the dimensions of the members shown in the drawings do not faithfully reflect actual dimensions of the constituent members, dimensional ratios of the constituent members, etc.

[Embodiment 1]

Figure 1:
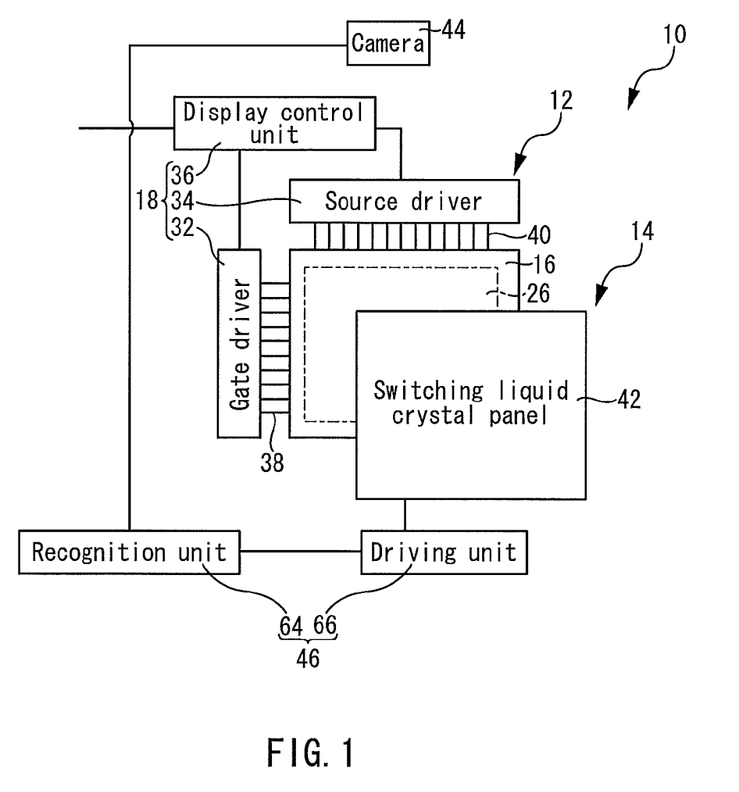
FIG. 1 is a block diagram showing an exemplary schematic configuration of a display device as Embodiment 1 of the present invention.

FIG. 1 shows a display device 10 as Embodiment 1 of the present invention. Specific examples of the display device 10 include portable information terminals such as a PDA (Personal Digital Assistant), game machines, desktop personal computers, laptop personal computers, television sets for home use, and on-vehicle televisions.

The display device 10 includes a display unit 12 and an image separation unit 14. The display unit 12 includes a display panel 16 and a driving control section 18.

Figure 2:
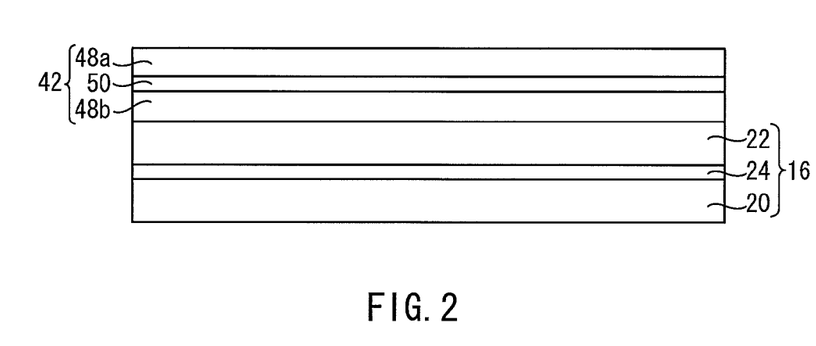
FIG. 2 is a schematic diagram showing an exemplary schematic configuration of the display device shown in FIG. 1.

The display panel 16 is a liquid crystal panel. To simplify explain, the display panel 16 includes an active matrix substrate 20, a counter substrate 22, and a liquid crystal layer 24 sealed between the active matrix substrate 20 and the counter substrate 22, as shown in FIG. 2.

In the display panel 16, a plurality of pixels 28 (see FIG. 6 to FIG. 9 to be described later) are formed in matrix. An area where a plurality of pixels 28 are formed in matrix forms a display area 26 of the display panel 16.

In the present embodiment, in the area, each pixel 28 includes three subpixels 30 (a red pixel (R pixel), a green pixel (G pixel), and a blue pixel (B pixel)), as shown in FIGS. 6 to 9 to be described later. Particularly in the present embodiment, the three subpixels 30 are arrayed in the lateral direction of the display area 26 (the horizontal direction in FIGS. 6 to 9), and subpixels 30R for the right eye and subpixels 30L for the left eye are arrayed alternately in the lateral direction of the display area 26.

In other words, in the present embodiment, lines of subpixels that display an image to be viewed by a viewer's right eye (right eye image) and line of subpixels that display an image to be viewed by the viewer's left eye (left eye image) are alternately arranged. In other words, the right eye image and the left eye image are divided (into stripes) so as to correspond to the lines of the subpixels. A synthetic image in which these stripes of the right eye image and those of the left eye image thus divided are alternately arranged are displayed on the display area 26.

The driving control section 18 drives and controls the display panel 16. The driving control section 18 includes a gate driver 32, a source driver 34, and a display control unit 36, as shown in FIG. 1.

To the gate driver 32, a plurality of gate lines 38 are connected. These gate lines 38 are connected to gate electrodes of thin film transistors as switching elements (not shown), respectively. The thin film transistors are formed on the active matrix substrate 20. Each gate line 38 transmits scanning signals that are output from the gate driver 32. According to the scanning signals input to the gate electrodes, the thin film transistors are driven and controlled.

To the source driver 34, a plurality of source lines 40 are connected. These source lines 40 are connected to source electrodes of the thin film transistors, respectively. Each source line 40 transmits display signals that are output from the source driver 34. When a display signal is input to the thin film transistor while the thin film transistor is being driven, charges according to the display signal are accumulated in an accumulation capacitor connected to the thin film transistor. The accumulation capacitor is composed of a pixel electrode that is formed on the active matrix substrate 20 and is connected to the drain of the thin film transistor, a common electrode that is formed on the counter substrate 22 and is arranged so as to face the pixel electrode, and a portion of the liquid crystal layer 24 that is positioned between the pixel electrode and the common electrode. By accumulating charges according to the display signal in the accumulation capacitor, the gray scale level of each subpixel can be controlled. As a result, an image can be displayed on the display panel 16.

The display control unit 36 generates various types of signals necessary for image display, based on display data signals fed from the outside and timing control signals, and outputs the same to the gate driver 32 and the source driver 34. The above-described synthetic image is generated by the display control unit 36.

Figure 3:
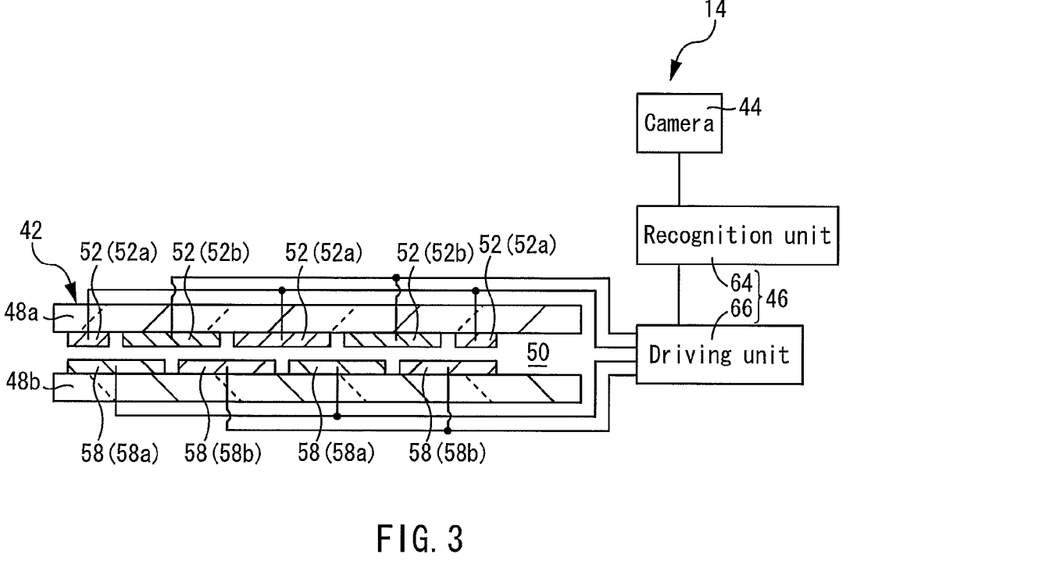
FIG. 3 is a cross-sectional view showing an exemplary schematic configuration of an image separation unit that the display device shown in FIG. 1 includes.

The image separation unit 14 includes a switching liquid crystal panel 42, a camera 44, and a control section 46, as shown in FIG. 3. The switching liquid crystal panel 42 is arranged on one side in the thickness direction of the display panel 16, as shown in FIG. 2.

It should be noted that on the other side in the thickness direction of the display panel 16, a backlight is arranged, though not shown in the drawings. As the backlight, for example, any one of the following can be used: an edge light type backlight; a direct backlight; and a planar light source type backlight. As a light source for the backlight, for example, a cold-cathode tube, a light-emitting diode (LED), or the like can be used.

The switching liquid crystal panel 42 includes a pair of substrates 48a and 48b, and a liquid crystal layer 50 sealed between the pair of substrates 48a and 48b. It should be noted that the switching liquid crystal panel 42 includes a polarizing plate on each side thereof in the thickness direction, though not shown in the drawings.

As the pair of substrates 48a and 48b, for example, glass substrates or the like can be used.

Figure 4:
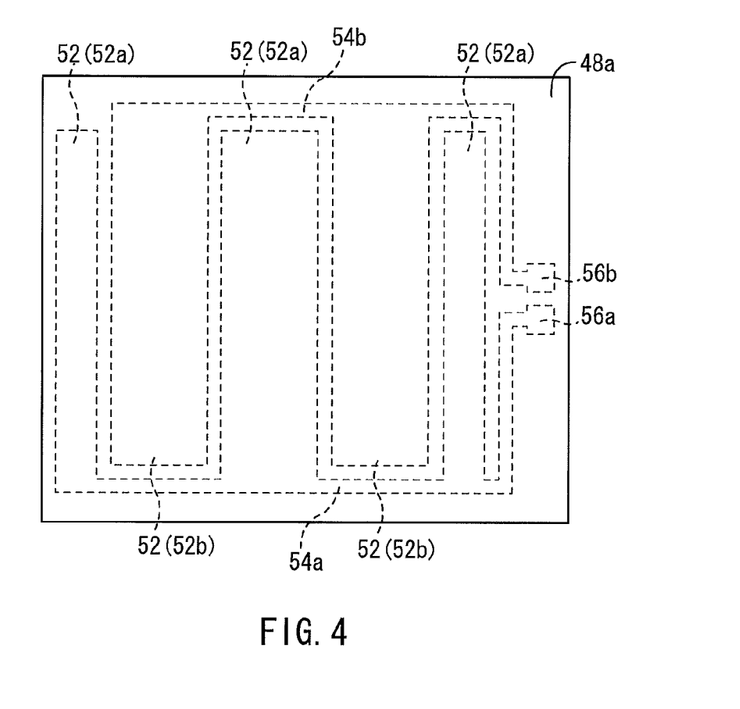
FIG. 4 is a plan view showing an example of a plurality of electrodes formed on one of the substrates shown in FIG. 3.

As shown in FIG. 4, on the substrate 48a on one side, a plurality of electrodes 52 are formed. As each electrode 52, for example, a transparent conductive film can be used. As the transparent conductive film, for example, an indium tin oxide film (ITO film) or the like can be used.

The plurality of electrodes 52 include a plurality of first electrodes 52a and a plurality of second electrodes 52b, as shown in FIG. 4. It should be noted that FIG. 4 shows only three first electrodes 52a and two second electrodes 52b, to facilitate understanding, but arbitrary numbers of these first electrode 52a and second electrode 52b may be provided.

The plurality of first electrodes 52a extend in the vertical direction of the substrate 48a (the vertical direction of the display area 26), in an approximately uniform width each. In other words, the plurality of first electrodes 52a are arrayed in the lateral direction of the substrate 48a (the lateral direction of the display area 26).

An offset distance between two adjacent ones of the first electrodes 52a (an arrangement pitch of the first electrodes 52a) is equivalent to a dimension of two subpixels in the direction in which the plurality of first electrodes 52a are arrayed (see FIGS. 6 to 9).

Ends of the first electrodes 52a on one side in the lengthwise direction (lower ends as viewed in FIG. 4) are joined via a joining electrode 54a. The joining electrode 54a extends in the lateral direction of the substrate 48a, in an approximately uniform width. As the joining electrode 54a, for example, a metal film made of titanium, molybdenum, or the like can be used.

At one end of the joining electrode 54a, a terminal part 56a is formed. To the terminal part 56a, a driving part 66 that will be described later is connected.

The plurality of second electrodes 52b extend in the vertical direction of the substrate 48a, in an approximately uniform width each. In other words, the plurality of second electrodes 52b are arrayed in the lateral direction of the substrate 48a.

Each second electrode 52b is arranged between two adjacent ones of the first electrodes 52a. In this way, the first electrodes 52a and the second electrodes 52b are arranged alternately.

An offset distance between two adjacent ones of the second electrodes 52b (an arrangement pitch of the second electrodes 52b) is equivalent to a dimension of two subpixels in the direction in which the plurality of second electrodes 52b are arrayed (see FIGS. 6 to 9).

An offset distance between two adjacent ones of the electrodes 52 (an offset distance between the first electrode 52a and the second electrode 52b), that is, the arrangement pitch of the electrodes 52, is equivalent to a dimension of one subpixel in the direction in which the plurality of electrodes 52 are arrayed (see FIGS. 6 to 9).

Ends of the second electrodes 52b on the other side in the lengthwise direction (upper ends as viewed in FIG. 4) are joined via a joining electrode 54b. The joining electrodes 54b extends in the lateral direction of the substrate 48a, in an approximately uniform width. As the joining electrode 54b, for example, a metal film made of titanium, molybdenum, or the like can be used.

At one end of the joining electrode 54b, a terminal part 56b is formed. To the terminal part 56b, the driving part 66, which will be described later, is connected.

Figure 5:
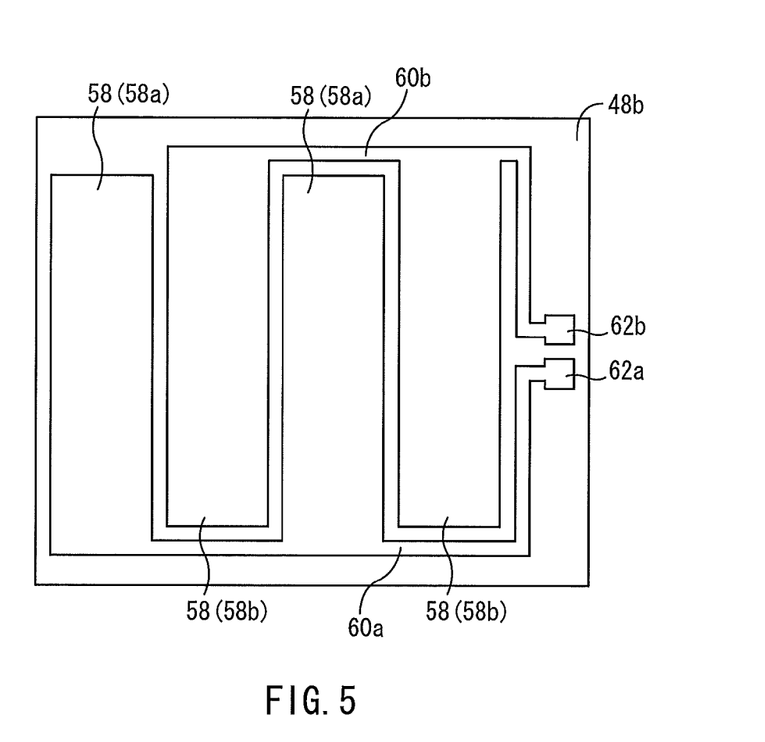
FIG. 5 is a plan view showing an example of a plurality of electrodes formed on the other one of the substrates shown in FIG. 3.

On the substrate 48b, a plurality of electrodes 58 are formed, as shown in FIG. 5. As each electrode 58, for example, a transparent conductive film can be used. As the transparent conductive film, for example, an indium tin oxide film (ITO film) or the like can be used.

The plurality of electrodes 58 include a plurality of first electrodes 58a and a plurality of second electrodes 58b, as shown in FIG. 5. It should be noted that FIG. 5 shows only two first electrodes 58a and two second electrodes 58b, to facilitate understanding, but arbitrary number of these first electrodes 58a and second electrodes 58b may be provided.

The plurality of first electrode 58a extend in the vertical direction of the substrate 48b (the vertical direction of the display area 26), in an approximately uniform width each. In other words, the plurality of first electrodes 58a are arrayed in the lateral direction of the substrate 48b (the lateral direction of the display area 26).

An offset distance between two adjacent ones of the first electrodes 58a (an arrangement pitch of the first electrodes 58a) is equivalent to a dimension of two subpixels in the direction in which the plurality of first electrodes 58a are arrayed (see FIGS. 6 to 9).

Ends of the first electrodes 58a on one side in the lengthwise direction (lower ends as viewed in FIG. 5) are joined via a joining electrodes 60a. The joining electrode 60a extends in the lateral direction of the substrate 48b, in an approximately uniform width. As the joining electrode 60a, for example, a metal film made of titanium, molybdenum, or the like can be used.

At one end of the joining electrode 60a, a terminal part 62a is formed. To the terminal part 62a, the driving part 66, which will to be described later, is connected.

The plurality of second electrodes 58b extend in the vertical direction of the substrate 48b, in an approximately uniform width each. In other words, the plurality of second electrodes 58b are arrayed in the lateral direction of the substrate 48b.

Each second electrode 58b is arranged between two adjacent ones of the first electrodes 58a. In this way, the first electrodes 58a and the second electrodes 58b are arranged alternately.

An offset distance between two adjacent ones of the second electrodes 58b (an arrangement pitch of the second electrodes 58b) is equivalent to a dimension of two subpixels in the direction in which the plurality of second electrodes 58b are arrayed (see FIGS. 6 to 9).

An offset distance between two adjacent ones of the electrodes 58 (an offset distance between the first electrode 58a and the second electrode 58b), that is, an arrangement pitch of the electrodes 58 is equivalent to a dimension of one subpixel in the direction in which the plurality of electrodes 58 are arrayed (see FIGS. 6 to 9).

Ends of the second electrodes 58b on the other side in the lengthwise direction (upper ends as viewed in FIG. 5) are joined via a joining electrodes 60b. The joining electrode 60b extends in the lateral direction of the substrate 48b, in an approximately uniform width. As the joining electrode 60b, for example, a metal film made of titanium, molybdenum, or the like can be used.

At one end of the joining electrode 60b, a terminal part 62b is formed. To the terminal part 62b, the driving part 66, which will be described later, is connected.

When viewed in the direction in which the pair of substrates 48a and 48b are opposed to each other, each of the plurality of electrodes 58 formed on the substrate 48b overlaps two electrodes 52 adjacent in the direction in which the plurality of electrodes 52 are arrayed, among the plurality of electrodes 52 formed on the substrate 48a. Further, among the plurality of electrodes 52 formed on the substrate 48a, each of the electrodes 52 except for the two electrodes 52 positioned at both ends in the direction in which the plurality of electrodes 52 are arrayed overlaps two electrodes 58 adjacent in the direction in which the plurality of electrodes 58 are arrayed, among the plurality of electrodes 58 formed on the substrate 48b.

Particularly in the present embodiment, when viewed in the direction in which the pair of substrates 48a and 48b are opposed to each other, the width-direction center of each electrode 58 formed on the substrate 48b (the center thereof in the lateral direction of the substrate 48b) is positioned on each boundary between two electrodes 52 that overlap the above-mentioned electrode 58. Further, the width-direction center (the center in the lateral direction of the substrate 48a) of each of the electrodes 52 except for the two electrodes 52 positioned at both ends in the direction in which the plurality of electrodes 52 are arrayed is positioned on a boundary between two electrodes 58 that overlap the above-mentioned electrode 52 in the direction in which the substrates 48a and 48b are opposed to each other.

As the liquid crystal of the liquid crystal layer 50, for example, TN (Twisted Nematic) liquid crystal can be used. In the liquid crystal layer 50, a time necessary for realizing light-shielding sections 68 that will be described later is shorter than a time necessary for removing the light-shielding sections 68.

The camera 44 constantly takes a picture of a viewer's face, in a state in which a synthetic image is displayed on the display area 26. As the camera 44, for example, a CMOS (Complementary Metal Oxide Semiconductor) camera, a CCD (charge-coupled device) camera, or the like can be used. The camera 44 is attached to, for example, the case of the display device 10.

The camera 44 is connected to a recognition part 64 (to be described later) provided in the control section 46. Thus, image data of a viewer's face that the camera 44 takes a picture of can be transmitted to the recognition part 64.

The control section 46 includes the recognition part 64 and the driving part 66. The recognition part 64 recognizes a viewer's face that the camera 44 takes a picture of, and obtains position information of the face. For example, by utilizing pattern recognition, the position information of a viewer's face can be obtained. In the present embodiment, for example, positions of both eyes of a viewer (for example, pupils of both eyes) are recognized, so that the midpoint of a line extended between the centers of the eyes (for example, pupils) is recognized as the lateral-direction center of the viewer's face. Using the horizontal-direction center of the face thus recognized and a predetermined reference position, the current position of the viewer's face is recognized. As the predetermined reference position, for example, the position where the camera 44 is attached, or the like, can be used.

The recognition part 64 is connected to the driving part 66. Thus, position data of the viewer's face that the recognition part 64 has recognized can be transmitted to the driving part 66.

The driving part 66 selects electrodes to which a specific voltage that is different from the reference voltage is to be applied, according to the position of the viewer's face that the recognition part 64 has recognized. In the present embodiment, the following can be used as the electrodes to which a specific voltage is to be applied (1) the plurality of first electrodes 52*a* formed on the substrate 48*a*; (2) the plurality of second electrodes 52*b* formed on the substrate 48*a*; (3) the plurality of first electrodes 58*a* formed on the other substrate 48*b*; and (4) the plurality of second electrode 58*b* formed on the other substrate 48*b*.

In the present embodiment, a voltage having a phase opposite that of the reference voltage is used as the specific voltage. It should be noted that as the reference voltage and the specific voltage, for example, an alternating-current voltage of 5V having a rectangular waveform or the like can be used. The frequency of the alternating-current voltage is not limited particularly. Incidentally, in the present embodiment, the frequency of the alternating-current voltage is set to be 90 Hz.

Figure 6:
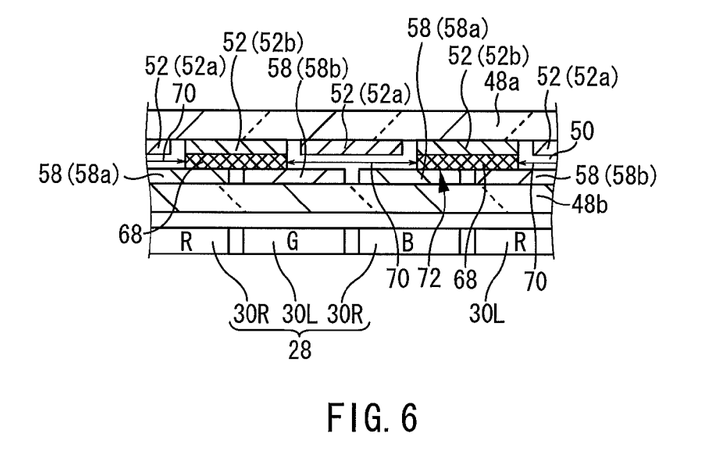
FIG. 6 is a cross-sectional view showing an exemplary parallax barrier realized in the switching liquid crystal panel shown in FIG. 3.

The driving part 66 applies the specific voltage to the selected electrodes, and applies the reference voltage to the rest of the electrodes. This causes orientation of liquid crystal molecules in the liquid crystal layer 50 to change, the liquid crystal molecules being positioned between the electrode to which the specific voltage is applied, and the two electrodes that overlap the foregoing electrode in the direction in which the pair of substrates 48*a* and 48*b* are opposed (the two electrodes to which the reference voltage is applied). As a result, in the switching liquid crystal panel 42, a plurality of light-shielding sections 68 are realized, as shown in FIG. 6. A part between two adjacent ones of the light-shielding sections 68 functions as a slit 70 that transmits light from the backlight. In other words, the realization of the plurality of light-shielding sections 68 allows a parallax barrier 72 in which the slits 70 and the light-shielding sections 68 are arrayed alternately to be realized in the switching liquid crystal panel 42.

In the display device 10, in the case where a stereoscopic image is shown to a viewer, a right eye image and a left eye image displayed on the display panel 16 are shown to the viewer via the parallax barrier 72 displayed on the switching liquid crystal panel 42. With this, only the right eye image reaches the viewer's right eye, and only the left eye image reaches the viewer's left eye. As a result, the viewer can view a stereoscopic image without using glasses.

Further, the driving part 66 changes the electrodes to which the specific voltage is applied, according to the position of the viewer's face recognized by the recognition part 64. For example, a case where a plurality of light-shielding sections 68 are realized at positions shown in FIG. 6 is assumed.

In FIG. 6, a specific voltage is applied to the plurality of second electrodes 52*b* formed on the substrate 48*a*, and a reference voltage is applied to the other electrodes (the plurality of first electrodes 52*a* formed on the substrate 48*a* and the plurality of electrodes 58 formed on the other substrate). This allows a plurality of light-shielding sections 68 to be realized at positions corresponding to the plurality of second electrodes 52*b*.

In the case where the viewer's face moves in the lateral direction of the display area 26 (the horizontal direction as viewed in FIG. 6), the driving part 66 changes electrodes to which the specific voltage is applied, according to a distance for which the viewer's face has moved. For example, in the case where the position of the parallax barrier 72 is changed from the position shown in FIG. 6 to the position shown in FIG. 7, the electrodes to which the specific voltage is applied are changed from the plurality of second electrodes 52*b* formed on the substrate 48*a* to the plurality of second electrodes 58*b* formed on the substrate 48*b*. This causes the parallax barrier 72 to move in the lateral direction of the display area 26. The distance for which the parallax barrier 72 moves is equivalent to approximately half of the width dimension of the subpixel 30 (dimension in the lateral direction of the display area 26). In this case, the plurality of second electrodes 52*b* compose a first electrode group, and the plurality of second electrodes 58*b* compose a second electrode group.

Figure 8:
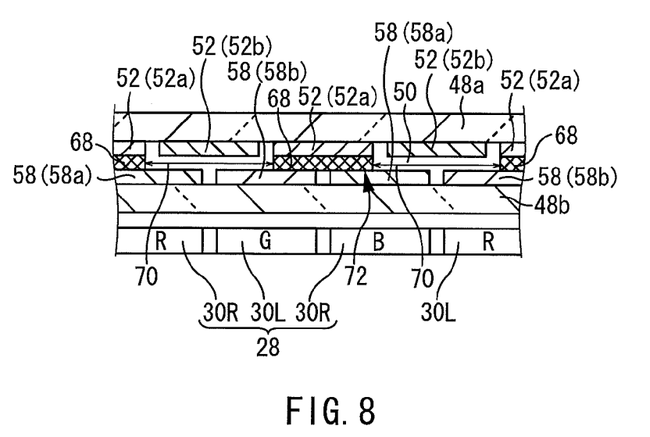
FIG. 8 is a cross-sectional view showing still another exemplary parallax barrier realized in the switching liquid crystal panel shown in FIG. 3.

In the case where the position of the parallax barrier 72 is changed from the position shown in FIG. 6 to the position shown in FIG. 8, the electrodes to which the specific voltage is applied are changed from the plurality of second electrodes 52*b* formed on the substrate 48*a*, to the plurality of first electrodes 52*a* formed on the substrate 48*a*. This causes the parallax barrier 72 to move in the lateral direction of the display area 26. The distance for which the parallax barrier 72 moves is approximately equal to the width dimension of the subpixel 30. In this case, the plurality of second electrodes 52*b* compose the first electrode group, and the plurality of first electrodes 52*a* compose the second electrode group.

Figure 9:
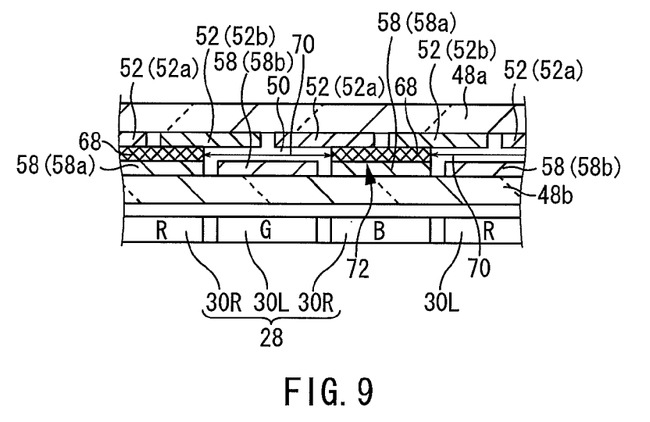
FIG. 9 is a cross-sectional view showing still another exemplary parallax barrier realized in the switching liquid crystal panel shown in FIG. 3.

In the case where the position of the parallax barrier 72 is changed from the position shown in FIG. 6 to the position shown in FIG. 9, the electrodes to which the specific voltage is applied are changed from the plurality of second electrodes 52*b* formed on the substrate 48*a*, to the plurality of first electrodes 58*a* formed on the substrate 48*b*. This causes the parallax barrier 72 to move in the lateral direction of the display area 26. The distance for which the parallax barrier 72 moves is equivalent to approximately 1.5 times the width dimension of the subpixel 30. In this case, the plurality of second electrodes 52*b* compose the first electrode group, and the plurality of first electrodes 58*a* compose the second electrode group.

It should be noted that when the parallax barrier 72 is further moved from the position shown in FIG. 9 to the side opposite to the position shown in FIG. 8, the parallax barrier 72 consequently returns to the position shown in FIG. 6. Therefore, in the present embodiment, the position of the parallax barrier 72 is either one of the positions shown in FIGS. 6 to 9.

Further, as is clear from the above explanation, in the present embodiment, the minimum distance for which the parallax barrier 72 moves is equivalent to approximately half of the width dimension of the subpixel 30.

Further, in the case where the electrodes to which the specific voltage is applied are changed, the driving part 66 delays the switching from the reference voltage to the specific voltage, as compared with the switching from the specific voltage to the reference voltage. For example, the following case is assumed: a case where the electrodes to which the specific voltage is applied are changed from the plurality of second electrodes 52b formed on the substrate 48a, to the plurality of second electrodes 58b formed on the substrate 48b (a case where the parallax barrier 72 is moved from the position shown in FIG. 6 to the position shown in FIG. 7).

Figure 10:
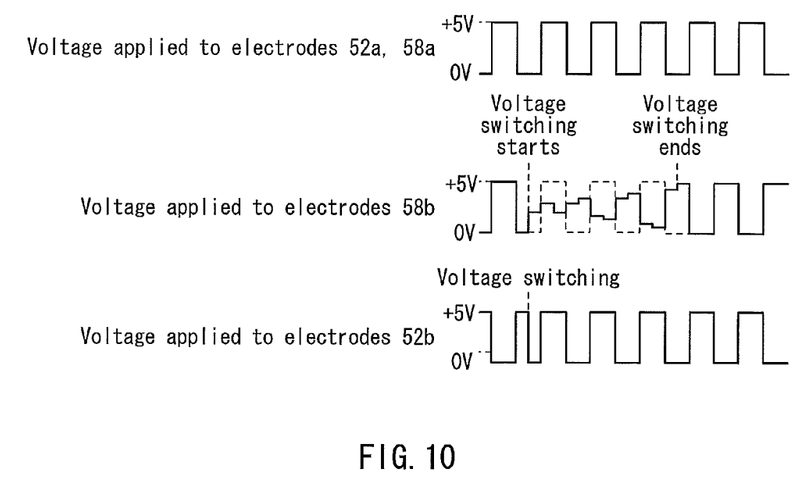
FIG. 10 is a timing chart showing patterns of voltages applied to electrodes when the parallax barrier is moved from the position shown in FIG. 6 to the position shown in FIG. 7.

As shown in FIG. 10, the voltage applied to the plurality of second electrodes 52b formed on the substrate 48a is switched from the specific voltage to the reference voltage all at once. At the same time when the voltage applied to the plurality of second electrodes 52b formed on the substrate 48a is switched from the specific voltage to the reference voltage at once, the voltage applied to the plurality of second electrodes 58b formed on the substrate 48b starts switching from the reference voltage to the specific voltage.

In the present embodiment, the voltage applied to the plurality of second electrodes 58b formed on the substrate 48b is switched from the reference voltage to the specific voltage stepwise. The voltage that is first applied during the switching from the reference voltage to the specific voltage is set based on the relationship between the transmittance of the liquid crystal and the applied voltage. For example, a voltage at which the transmittance starts changing drastically may be applied first, which makes it easier to cause the transmittance to change in the case where the voltage applied thereafter is increased. Particularly, in the present embodiment, a voltage at which the transmittance starts changing drastically is applied for a predetermined period first, and thereafter, the voltage applied is increased stepwise.

In the display device 10 having such a configuration, the plurality of light-shielding sections 68 are realized at positions corresponding to any of the following: the plurality of first electrodes 52a formed on the substrate 48a; the plurality of second electrodes 52b formed on the substrate 48a; the plurality of first electrodes 58a formed on the substrate 48b; and the plurality of second electrodes 58b formed on the substrate 48b. As a result, the control of the voltage applied to the electrodes can be simplified.

Particularly, in the present embodiment, the plurality of first electrodes 52a formed on the substrate 48a, the plurality of second electrodes 52b formed on the substrate 48a, the plurality of first electrodes 58a formed on the substrate 48b, and the plurality of second electrodes 58b formed on the substrate 48b are joined by the joining electrodes 54a, 54b, 60a, and 60b, respectively. This configuration makes it possible to supply voltages to the plurality of first electrodes 52a formed on the substrate 48a, the plurality of second electrodes 52b formed on the substrate 48a, the plurality of first electrodes 58a formed on the substrate 48b, and the plurality of second electrodes 58b formed on the substrate 48b, respectively, at once. As a result, this makes it possible to simplify the lines for applying voltages to the plurality of electrodes.

Further, in the display device 10, in the case where the electrodes to which the specific voltage is applied are changed, the switching from the reference voltage to the specific voltage is delayed with respect to the switching from the specific voltage to the reference voltage. This makes it possible to approximately equalize the time necessary for realizing new light-shielding sections 68, and the time necessary for removing light-shielding sections 68 that have been realized so far. As a result, this makes it possible to prevent the display area 26 from becoming darker when the light-shielding sections 68 move.

In the present embodiment, whereas the switching from the specific voltage to the reference voltage is carried out immediately, the switching from the reference voltage to the specific voltage is carried out stepwise. As a result, this makes it possible to provide a natural appearance when the light-shielding sections 68 move.

Further, in the display device 10, the minimum distance for which the parallax barrier 72 moves is equivalent to approximately half of the width dimension of the subpixel 30. As a result, even if a viewer's face moves slightly, a stereoscopic image to be shown can be shown to the viewer.

Further, in the display device 10, as the specific voltage has a phase opposite that of the reference voltage, the generation of the specific voltage and the reference voltage is facilitated.

[Application Example 1 of Embodiment 1]

Figure 7:
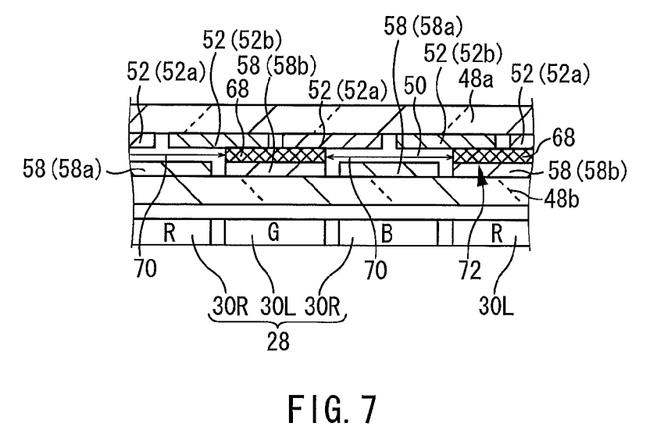
FIG. 7 is a cross-sectional view showing another exemplary parallax barrier realized in the switching liquid crystal panel shown in FIG. 3.

For example, a case where the electrodes to which a specific voltage is applied are changed from the plurality of second electrodes 52b formed on the substrate 48a to the plurality of second electrodes 58b formed on the substrate 48b (a case where the parallax barrier 72 is moved from the position shown in FIG. 6 to the position shown in FIG. 7) is assumed.

Figure 11:
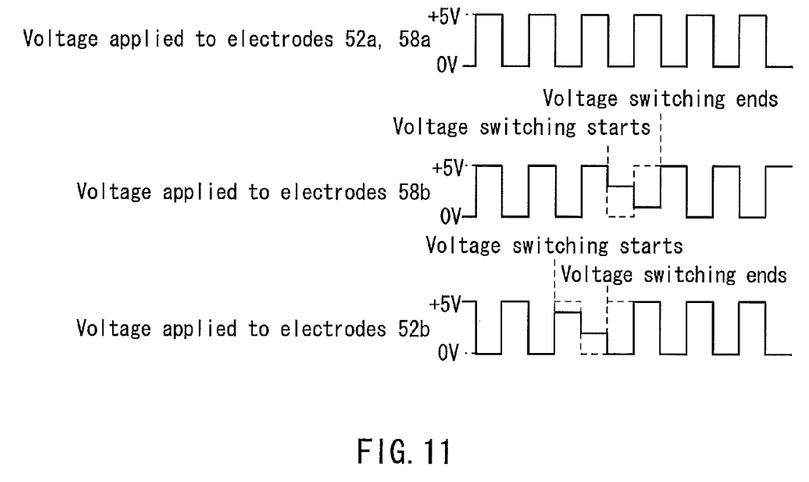
FIG. 11 is a timing chart showing patterns of voltages applied to electrodes when the parallax barrier is moved from the position shown in FIG. 6 to the position shown in FIG. 7 in Application Example 1 of Embodiment 1.

In the present application example, as shown in FIG. 11, the timing when the switching of the voltage applied to the plurality of second electrodes 52b formed on the substrate 48a starts (the timing at which the switching from the specific voltage to the reference voltage starts) is antecedent to the timing when the switching of the voltage applied to the plurality of second electrodes 58b formed on the substrate 48b starts (the timing at which the switching from the reference voltage to the specific voltage starts). Further, the switching of the voltage applied to the plurality of second electrodes 52b formed on the substrate 48a (the switching from the specific voltage to the reference voltage) and the switching of the voltage applied to the plurality of second electrodes 58b formed on the substrate 48b (the switching from the reference voltage to the specific voltage) are carried out stepwise.

[Application Example 2 of Embodiment 1]

For example, a case where the electrodes to which a specific voltage is applied are changed from the plurality of second electrodes 52b formed on the substrate 48a to the plurality of second electrodes 58b formed on the substrate 48b (a case where the parallax barrier 72 is moved from the position shown in FIG. 6 to the position shown in FIG. 7) is assumed.

Figure 12:
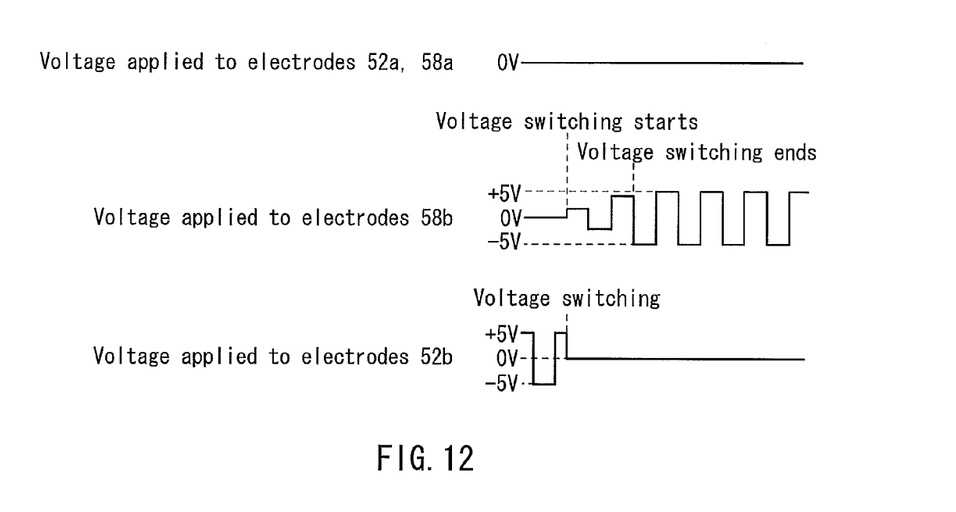
FIG. 12 is a timing chart showing patterns of voltages applied to electrodes when the parallax barrier is moved from the position shown in FIG. 6 to the position shown in FIG. 7 in Application Example 2 of Embodiment 1.

In the present application example, the reference voltage is at a constant level, as shown in FIG. 12. As such a reference voltage, for example, GND (the ground voltage) or the like can be used. On the other hand, as the specific voltage, an alternating-current voltage that goes to the plus side and the minus side with respect to the reference voltage alternately and repeatedly is used. In the present application example, since the reference voltage is at a constant level, the voltage control is facilitated.

[Application Example 3 of Embodiment 1]

For example, a case where the electrodes to which a specific voltage is applied are changed from the plurality of second electrodes 52b formed on the substrate 48a to the plurality of second electrodes 58b formed on the substrate 48b (a case where the parallax barrier 72 is moved from the position shown in FIG. 6 to the position shown in FIG. 7) is assumed.

Figure 13:
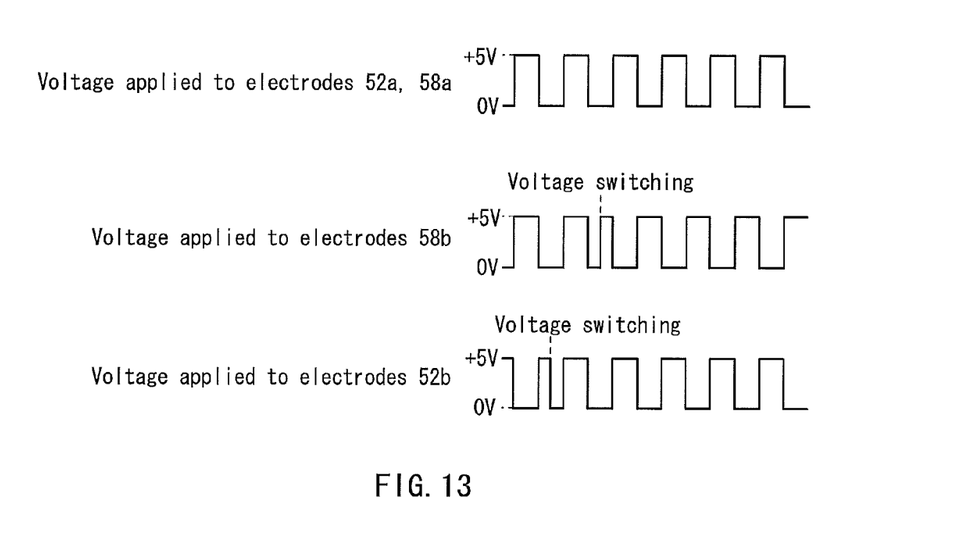
FIG. 13 is a timing chart showing patterns of voltages applied to electrodes when the parallax barrier is moved from the position shown in FIG. 6 to the position shown in FIG. 7 in Application Example 3 of Embodiment 1.

In the present application example, as shown in FIG. 13, the timing when the voltage applied to the plurality of second electrodes 52b formed on the substrate 48a is switched (the timing when the voltage is switched from the specific voltage to the reference voltage) is antecedent to the timing when the voltage applied to the plurality of second electrodes 58b formed on the substrate 48b is switched (the timing when the voltage is switched from the reference voltage to the specific voltage). Further, the switching of the voltage applied to the plurality of second electrodes 52b formed on the substrate 48a (the switching from the specific voltage to the reference voltage) is carried out at once, and so is the switching of the voltage applied to the plurality of second electrodes 58b formed on the substrate 48b (the switching from the reference voltage to the specific voltage). Further, a certain time lapses after the voltage applied to the plurality of second electrodes 52b formed on the substrate 48a is switched from the specific voltage to the reference voltage, and then, the voltage applied to the plurality of second electrodes 58b formed on the substrate 48b is switched from the reference voltage to the specific voltage.

[Embodiment 2]

Figure 14:
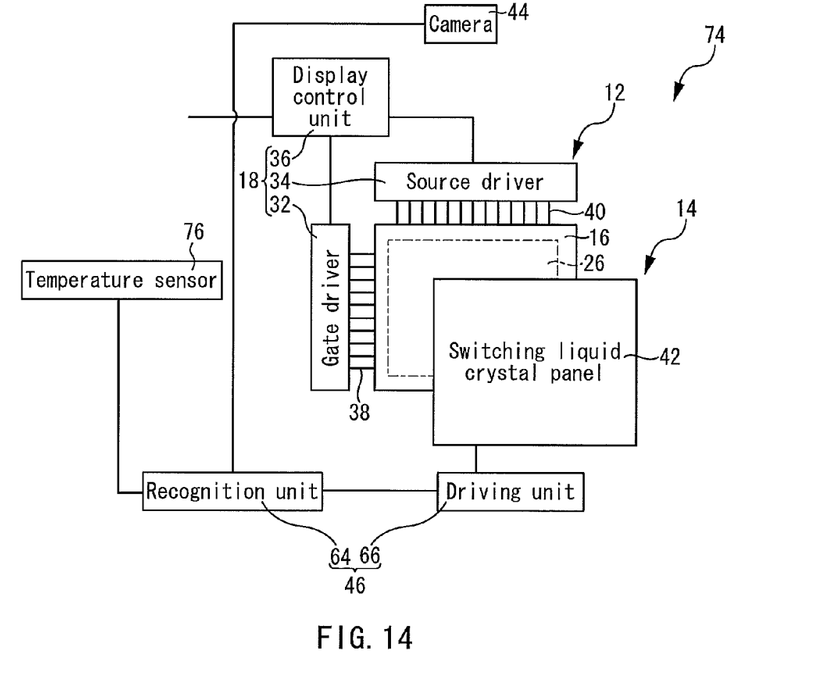
FIG. 14 is a block diagram showing an exemplary schematic configuration of a display device as Embodiment 2 of the present invention.

Hereinafter, a display device as Embodiment 2 of the present invention is explained with reference to FIG. 14. It should be noted that in the following explanation, the members and portions having the same structures as those in Embodiment 1 are denoted by the same reference numerals as those in Embodiment 1 in the drawing, and detailed explanations of the same are omitted.

A display device 74 of the present embodiment further includes a temperature sensor 76 in addition to the configuration of the display device 10 of Embodiment 1. The temperature sensor 76 detects an ambient temperature of the display panel 16. As the temperature sensor 76, for example, a thermister, a thermocouple, or the like can be used.

The temperature sensor 76 is connected to the recognition part 64. This allows data about the ambient temperature of the display device 74 to be transmitted to the recognition part 64.

Figure 15:
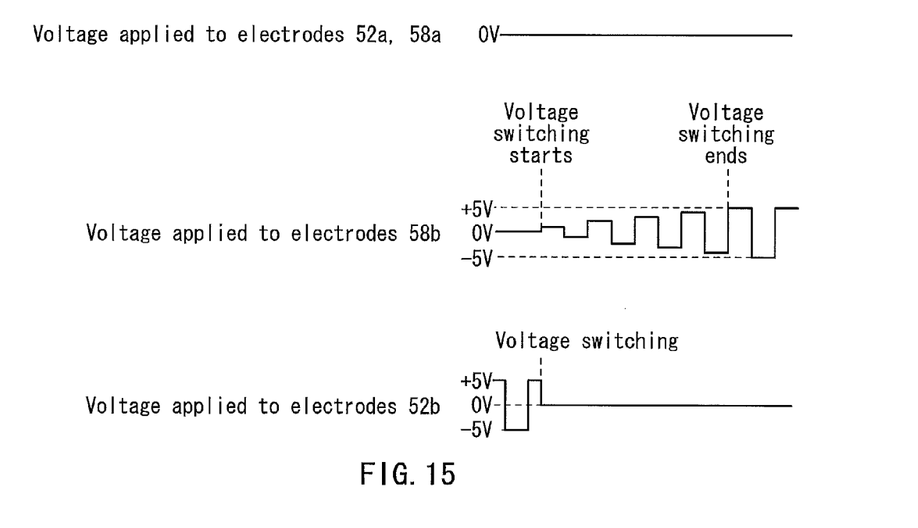
FIG. 15 is a timing chart showing patterns of voltages applied to electrodes when the parallax barrier is moved from the position shown in FIG. 6 to the position shown in FIG. 7 in a state where the temperature is 0° C.
Figure 16:
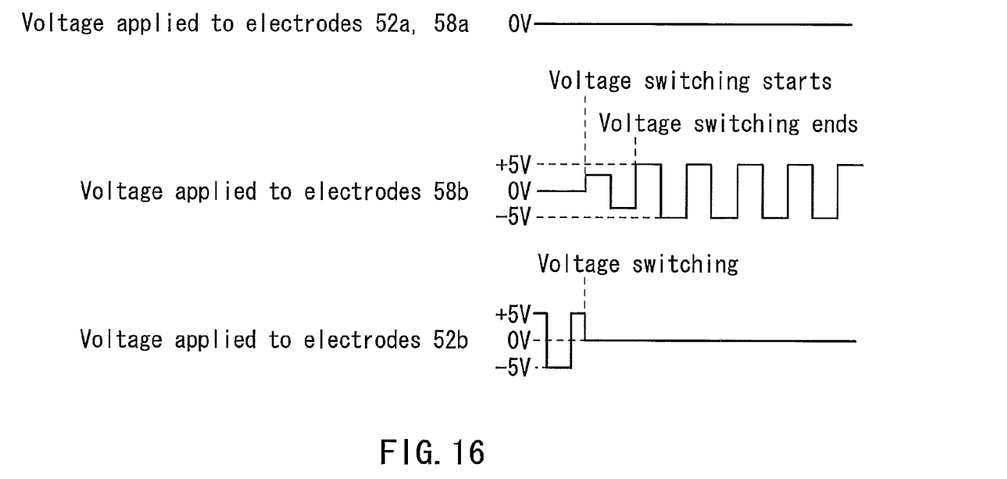
FIG. 16 is a timing chart showing patterns of voltages applied to electrodes when the parallax barrier is moved from the position shown in FIG. 6 to the position shown in FIG. 7 in a state where the temperature is 50° C.

The recognition part 64 adjusts the timing of the switching from the reference voltage to the specific voltage according to the ambient temperature of the display device 74. For example, regarding the case where the temperature is 0° C. and the case where it is 50° C., the liquid crystal molecules exhibit different response speeds. In the case where the temperature is 50° C., liquid crystal molecules exhibits a faster response speed, as compared with the case where the temperature is 0° C. Therefore, the time necessary for switching the voltage from the reference voltage to the specific voltage in the case where the temperature is 50° C. (see FIG. 16) is shorter than that in the case where the temperature is 0° C. (see FIG. 15). The temperature of 0° C. is, for example, outside air temperature in winter. The temperature of 50° C. is, for example, in-car temperature in summer. In the present embodiment, the reference voltage is at a constant level. On the other hand, the specific voltage is an alternating-current voltage that goes to the plus side and the minus side with respect to the reference voltage alternately and repeatedly (rectangular wave). It should be noted that FIGS. 15 and 16 show a case where the electrodes to which the specific voltage is applied are changed from the plurality of second electrodes 52b formed on the substrate 48a to the plurality of second electrodes 58b formed on the substrate 48b (the case where the parallax barrier 72 is moved to the position shown in FIG. 6 to the position shown in FIG. 7).

In the display device 74 having such a configuration, the switching from the reference voltage to the specific voltage is carried out, with the ambient temperature of the display panel 16 being taken into consideration. As a result, the voltage applied during the switching from the reference voltage to the specific voltage can be made more appropriate.

So far the embodiments of the present invention have been described in detail, but these are merely examples. The present invention is not limited by the above-described embodiments at all.

For example, in Embodiments 1 and 2 described above, the display panel 16 may be a plasma display panel, an organic EL (electroluminescence) panel, an inorganic ET, panel, or the like.

In Embodiments 1 and 2 described above, the display panel 16 may be positioned on the side close to the viewer, with respect to the switching liquid crystal panel 42.

In Embodiments 1 and 2 described above, the offset distance between two adjacent ones of the light-shielding sections 68 (the opening width of the slit 70) is set appropriately according to, for example, the offset distance between the pixel 28 and the parallax barrier 72, or the like. Therefore, the opening width of the slit 70 may be approximately equal to, for example, the width dimension of one pixel.

In Embodiments 1 and 2 described above, the subpixels 30 included in each pixel 28 may be an R pixel, a G pixel, a B pixel and a yellow pixel (Y pixel).

As a matter of course, the present invention is applicable to a display device that displays different images in a plurality of directions by using a common display screen.

The invention claimed is:

1. A display device comprising:
   a display unit that displays a synthetic image, the synthetic image being formed by dividing a plurality of images that are different from one another, and arraying these division images in a predetermined order; and
   an image separation unit that separates the plurality of images included in the synthetic image,
   wherein the image separation unit includes:
   a pair of substrates at least one of which has two types of electrode groups formed thereon, a reference voltage and a specific voltage different from the reference voltage being selectively applied to the two types of electrode groups;
   a liquid crystal layer sealed between the pair of substrates;
   a detection unit that detects a viewer's eye position; and
   a control unit that applies the specific voltage to one electrode groups that is selected from the electrode groups according to the viewer's eye position detected by the detection unit, so as to cause orientations of liquid crystal molecules in the liquid crystal layer to change, thereby to realize light-shielding sections that block light,
   wherein the electrode groups include a plurality of electrodes that are parallel to each other,
   on the substrate on which the two types of electrode groups are formed, out of the pair of substrates, the electrodes belonging to one of the two types of electrode groups and the electrodes belonging to the other electrode group are alternately arranged, and
   in the case where electrodes to which the specific voltage is applied are changed from a first electrode group to a second electrode group, the control unit switches the voltage applied to the first electrode group from the specific voltage to the reference voltage, and thereafter, switches the voltage applied to the second electrode group from the reference voltage to the specific voltage.

2. The display device according to claim 1, wherein
   the two types of electrode groups are formed on each of the pair of substrates,
   the electrodes belonging to the electrode group formed on one of the pair of substrates extend in the same direction as that of the electrodes belonging to the electrodes group formed on another one of the pair of substrates, and
   each of the electrodes belonging to the electrode groups formed on one of the substrates overlaps, in a normal direction of the substrate, one electrode belonging to one of the two electrode groups and one electrode belonging to the other electrode group formed on the other substrate.

3. The display device according to claim 1, wherein, in the case where the voltage applied to the electrode groups is switched from the reference voltage to the specific voltage, the control unit applies a voltage at a level between the reference voltage and the specific voltage at least once.

4. The display device according to claim 1, wherein, in the case where the voltage applied to the electrode groups is switched from the specific voltage to the reference voltage, the control unit applies a voltage at a level between the reference voltage and the specific voltage at least once.

5. The display device according to claim 1, wherein the image separation unit further includes a temperature sensor that detects an ambient temperature of the display panel, and
the control unit changes a duration of a period in which the voltage is switched from the reference voltage to the specific voltage according to a result of detection by the temperature sensor.

6. The display device according to claim 1, wherein the specific voltage and the reference voltage are alternating-current voltages having phases opposite to each other.

7. The display device according to claim 1, wherein the reference voltage is at a constant level, and the specific voltage is an alternating-current voltage.

8. The display device according to claim 1, wherein the display unit includes a display panel having a display area on which a plurality of pixels used for displaying the synthetic image are formed.

9. The display device according to claim 8, wherein the display panel is a transparent liquid crystal panel.

* * * * *